(12) United States Patent
Biggins

(10) Patent No.: US 6,474,673 B1
(45) Date of Patent: Nov. 5, 2002

(54) TRAILER HITCH CONVERSION APPARATUS

(76) Inventor: Douglas Biggins, 5570 Saturn Dr., Rapid City, SD (US) 57703

( * ) Notice: Subject to any disclaimer, the term of this patent is extended or adjusted under 35 U.S.C. 154(b) by 0 days.

(21) Appl. No.: 09/811,657

(22) Filed: Mar. 20, 2001

(51) Int. Cl.[7] .............................................. B62D 53/06
(52) U.S. Cl. ................... 280/417.1; 280/441.2
(58) Field of Search ................... 280/416.1, 417.1, 280/415.1, 476.1, 425.2, 441.2

(56) References Cited

U.S. PATENT DOCUMENTS

| | | | |
|---|---|---|---|
| 3,796,443 A | * 3/1974 | Crutchfield | 280/406 A |
| 3,810,661 A | * 5/1974 | Lowrance | 280/415 B |
| 3,815,936 A | * 6/1974 | Oaks, Jr. | 280/415 |
| 3,840,252 A | * 10/1974 | Jocoy | 280/415 A |
| 3,876,674 A | 4/1975 | Jenkins | |
| 3,889,978 A | 6/1975 | Kann | |
| 4,248,451 A | * 2/1981 | Usinger | 280/490 R |
| 4,832,358 A | 5/1989 | Bull | |
| 5,324,061 A | 6/1994 | Lay | |
| 5,566,964 A | 10/1996 | Leonard | |
| 5,797,614 A | 8/1998 | Hord et al. | |
| 6,109,640 A | 8/2000 | Allen et al. | |

* cited by examiner

Primary Examiner—Kevin Hurley
Assistant Examiner—Tony Winner
(74) Attorney, Agent, or Firm—Salzman & Levy

(57) ABSTRACT

An adapter for attaching a gooseneck or fifth wheel trailer hitch to a standard, V-shaped, trailer hitch. The hitch converting device contains a fifth wheel frame that attaches about the standard hitch and ball of a trailer device. The adapter provides a simple mechanism, whereby two different styles of hitches can be alternately operated by the same vehicle, with minimum securement.

8 Claims, 3 Drawing Sheets

TRAILER HITCH CONVERSION APPARATUS

FIELD OF THE INVENTION

The present invention relates to trailer hitches and, more particularly, to a new conversion device for converting a standard, V-shaped trailer hitch into a gooseneck or fifth wheel trailer hitch.

BACKGROUND OF THE INVENTION

Trailer hitching has been with us for a long time. The U-Haul Corporation helped popularize the concept many years ago, with its easy-to-attach trailer hitches. The public welcomed the chance to move their belongings inexpensively to their intended destination, and to have the peace of mind of having control over their possessions en route.

Although the concept was an immediate success, it has nonetheless given rise to several problems. For one thing, many individuals did not understand the dynamics of driving with a trailer in tow. These individuals would often overload their trailer, giving rise to dangerous fish-tailing of the cab. Also, the public did not realize that going downhill with a heavy, rear-ended load could put added strain on their automobile's breaking system. It was not uncommon in the early days to observe small vehicles with large loads in tow. The movie "The Long, Long Trailer", starring Lucille Ball and Desi Arnaz capitalized on the comic aspects of this situation. The movie featured an overloaded trailer, whose brakes failed going downhill.

Today, the art of trailer hitching is much safer and more sophisticated. However, like any mechanical apparatus or system, there is always room for further improvements.

A recent improvement over the standard trailer hitch was the gooseneck or fifth wheel hitch. The gooseneck hitch provided a stronger and more stable frame, capable of hauling larger trailer loads by truck.

The present invention features a new trailer hitch device for converting a standard, V-shaped hitch into a gooseneck or fifth wheel, hitch.

The invention comprises a converter device, which contains a gooseneck or fifth wheel hitch that attaches to a standard V-shaped hitch and hitch ball. The fifth wheel hitch fits about the standard trailer hitch and attaches thereto by means of extension brackets requiring securement with a few simple bolts. The converter mechanism provides a means whereby two different styles of hitches can be alternately operated by the same vehicle, with relative ease of accomplishing the conversion.

DISCUSSION OF RELATED ART

In U.S. Pat. No. 6,109,640 issued to Allen et al, on Aug. 29, 2000 for WHEELED GOOSENECK ADAPTER FOR STANDARD HITCH TRAILER, an adapter for converting a tag-along or standard trailer to a gooseneck trailer is shown. The adapter features a forward, raised, gooseneck towing frame, an intermediate vertical, rectangular-shaped frame that is supported upon intermediate wheels, and a rear rectangular frame with an adjustable horizontal beam. It should be observed that although this device may provide the support and greater stability that is the object of the current invention, it does so at the expense of being very complicated and being over designed. In addition, the influence of the intermediate wheels, while lending support, greatly restricts the ability of the trailer to follow the automobile around corners and sharp turns.

In U.S. Pat. No. 5,566,964 issued to Leonard on Oct. 22, 1996 for CONVERTIBLE TOWING SERVICE, a convertible towing device is shown that is used with a towing vehicle equipped with a trailer connector and a trailer. The trailer is generally of a dolly type, having a platform carried by two wheels. The device can be used as a fifth wheel hitch or as a hitch connection to a standard hitch connector.

In U.S. Pat. No. 5,324,061 issued to Lay on Jun. 28, 1994 for GOOSENECK HITCH APPARATUS, a gooseneck hitch is shown for attaching a gooseneck trailer to a conventional hitch ball. Removal of the gooseneck hitch, however, does not convert the apparatus to a standard ball attached hitch, as with the present invention.

In U.S. Pat. No. 4,832,358 issued to Bull on May 23, 1989 for TRAILER FIFTH WHEEL-GOOSENECK CONVERSION ADAPTER, an adapter apparatus is illustrated for permitting a trailer towed from a rear-mounted ball hitch, to be coupled to, and towed from, a truck having a fifth wheel hitch. Although the intent of this adapter is similar in scope to that of the present invention, the apparatus requires a complete break down of the device to accomplish the conversion. By contrast, the present invention allows attachment of a gooseneck hitch to a standard hitch by means of a triangular frame that is secured by only three bolts.

In U.S. Pat. No. 3,889,978 issued on Jun. 17, 1975 to Kann, for REMOVABLE GOOSENECK HITCH, a gooseneck extension member is shown that is specifically designed for attachment to a V-shaped hitching device. A bracing bar bolts across the triangular hitching device and attaches to the gooseneck extension member via a tie-rod.

In U.S. Pat. No. 3,876,674 issued on Apr. 8, 1975 to Jenkins, for TRAILER HITCH ADAPTER FOR PICKUP TRUCKS, an adapter is depicted wherein conventional recreational trailers can be connected to pickup trucks by a pivot disposed over the rear axle. It further includes a ball hitch and Z-shaped connecting unit.

In U.S. Pat. No. 5,797,614 issued to Hord et al, on Aug. 25, 1998 for CONVERTIBLE FOLDING GOOSENECK TRAILER HITCH, a folding gooseneck trailer hitch apparatus is illustrated. A mounting plate assembly comprises a conventional hitch ball, about which the gooseneck frame is attached. A plurality of adjustable anti-sway braces is provided.

In U.S. Pat. No. 3,815,936 issued on Jun. 11, 1974 to Oaks, Jr., for TRAILER HITCH ADAPTER, a trailer hitch adapter is shown for attaching the trailer to a towing vehicle.

SUMMARY OF THE INVENTION

In accordance with the present invention, there is provided an adapter for attaching a gooseneck or fifth wheel trailer hitch to a standard, V-shaped, trailer hitch. The hitch converting device contains a gooseneck frame that attaches about the standard hitch and ball. The gooseneck frame has an attachment bracket extending from distal arms. The bracket is secured to the standard hitch by means of a few bolts. Thus, there is provided a simple mechanism, whereby two different styles of hitches can be alternately operated by the same vehicle, with minimum securement.

It is an object of this invention to provide an improved adapter for securing a gooseneck or fifth wheel hitch upon a standard, V-shaped hitch.

It is another object of the invention to provide a simple means of securing and adapting a gooseneck hitch upon a standard, V-shaped hitch.

BRIEF DESCRIPTION OF THE DRAWINGS

A complete understanding of the present invention may be obtained by reference to the accompanying drawings, when considered in conjunction with the subsequent detailed description, in which.

For purposes of brevity and clarity, like components and is, elements of the apparatus of this invention, will bear the same designations or numbering throughout the figures.

DESCRIPTION OF THE PREFERRED EMBODIMENT

Generally speaking, the invention features an adapter for attaching a gooseneck or fifth wheel trailer hitch to a standard, V-shaped, trailer hitch. The hitch converting device contains a gooseneck frame that attaches about the standard hitch and ball of a trailer device. The gooseneck frame has an attachment bracket extending from distal arms. The bracket is secured to the standard hitch by means of a few bolts. Thus, there is provided a simple mechanism, whereby two different styles of hitches can be alternately operated by the same vehicle, with minimum securement.

Figure 1:
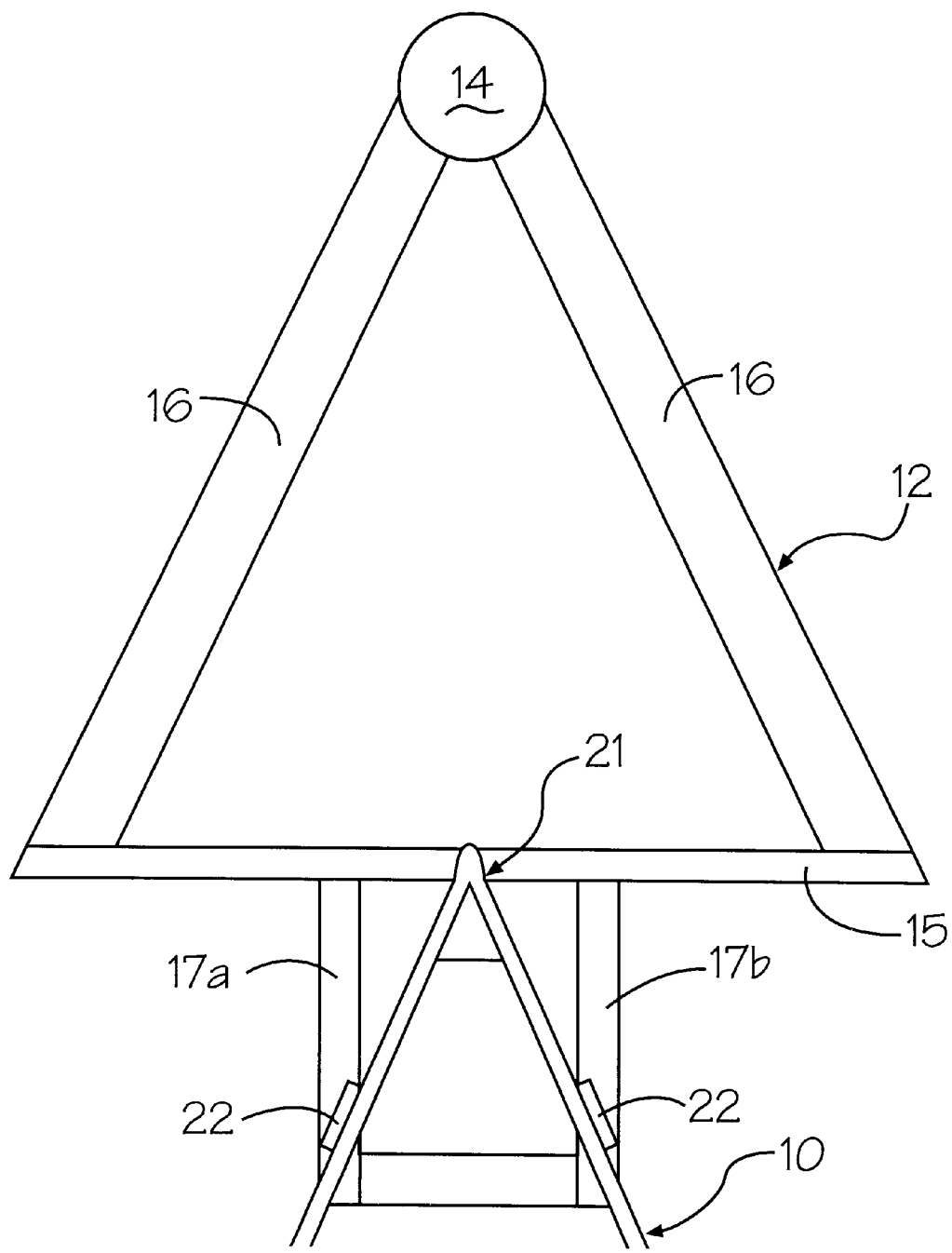
FIG. 1 illustrates a top view of a gooseneck or fifth wheel hitch that has been fitted over a standard V-shaped hitch, in accordance with the invention.
Figure 3:
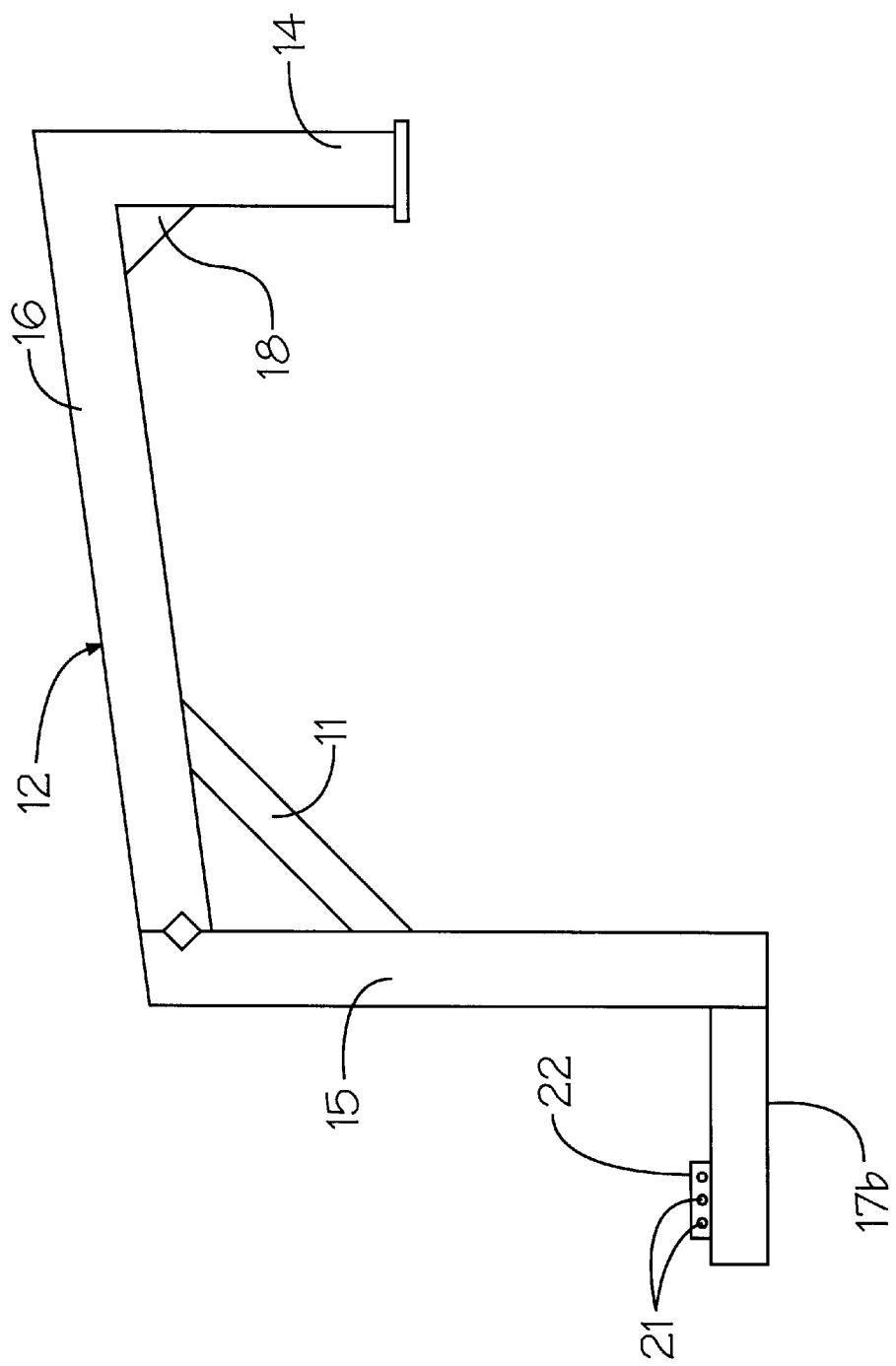
FIG. 3 shows a side view of the inventive apparatus illustrated in FIGS. 1 and 2.

Now referring to FIG. 1, a standard V-shaped trailer hitch 10 is shown in combination with the fifth-wheel adapter attachment 12 of this invention. The fifth-wheel adapter attachment 12 comprises a vertical column 14, which is usually attached to a pickup truck. The column 14 extends from V-shaped, horizontal frame members 16. The attachment of column 14 to the overhead frame members 16 is structurally reinforced by a small triangular gusset 18, as illustrated in FIG. 3.

Figure 2:
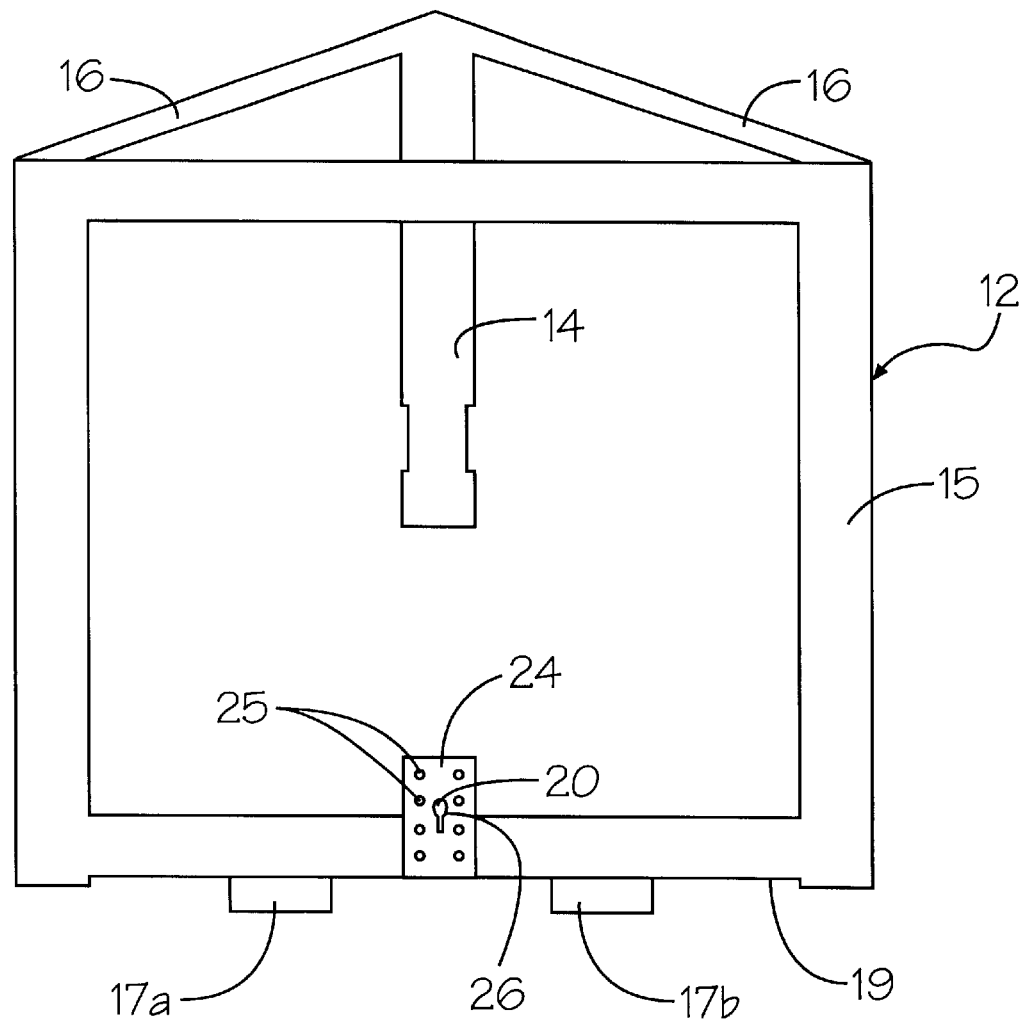
FIG. 2 depicts a back view of the inventive apparatus shown in FIG. 1.

Referring to FIG. 2, the adapter attachment 12 is shown in a rear view. The adapter attachment 12 further comprises a vertically disposed, rectangular frame member 15 that is integrally attached to V-shaped members 16. The rectangular frame member 15 has two horizontally extending arms 17a and 17b respectively, as can be also observed by reference to FIG. 3. These horizontal extension arms 17a and 17b, respectfully extend under the standard V-shaped hitch 10, as shown in FIG. 1, and are attached to the standard V-shaped hitch 10 by means of respective bracket plates 22, only one of which is shown in FIG. 3. These bracket plates 22 have a number of holes 21 for receiving bolts that secure the frame members 17a and 17b to the hitch 10. The rectangular frame member 15 is structurally reinforced with the horizontal frame members 16 via two gussets 11.

Referring once again to FIG. 2, the lower arm 19 of the vertically disposed rectangular frame 15 comprises a bracket 24 having bolt holes 25 for attachment to the front portion 21 of the hitch 10 (FIG. 1). The bracket 24 has an aperture 26 for receiving the hitch ball 20.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A hitch adapter for attaching a gooseneck or fifth wheel trailer hitch to a standard, V-shaped, trailer hitch, comprising: a fifth wheel hitch having a frame including a pair of arms extending therefrom for securement to a V-shaped trailer hitch, and a portion of a substantially vertically disposed, substantially rectangular member having attachment means for attachment to said V-shaped trailer hitch about a hitch ball of said V-shaped trailer, said pair of arms extending from said fifth wheel frame respectively, each of said pair of arms having bracket securement means including a front portion bracket for attaching said fifth wheel frame to said V-shaped trailer hitch, and means defining a front portion of said V-shaped trailer hitch, about which is disposed said attachment means.

2. The hitch adapter in accordance with claim 1, wherein said attachment means comprises a pair of brackets, each of said pair of brackets being respectively attached to said V-shaped trailer hitch.

3. The hitch adapter in accordance with claim 1, wherein said front portion bracket has an aperture for accommodating said hitch ball.

4. A hitch adapter for attaching a gooseneck or fifth wheel trailer hitch to a standard, V-shaped, trailer hitch, comprising: a fifth wheel hitch frame including a pair of arms extending therefrom for securement to said V-shaped trailer hitch, and a portion of a substantially vertically disposed, substantially rectangular member having securement means including a front portion bracket for attachment to a front portion of said V-shaped trailer hitch about a hitch ball of said V-shaped trailer hitch, each of said pair of arms respectively extending from said fifth wheel hitch frame, each of said pair of arms having bracket securement means for attaching said fifth wheel frame to said V-shaped trailer hitch.

5. The hitch adapter in accordance with claim 4, wherein said attachment means comprises a pair of brackets, each of said pair of brackets being respectively attached to said V-shaped trailer hitch.

6. The hitch adapter in accordance with claim 4, wherein said front portion bracket has an aperture for accommodating said hitch ball.

7. A hitch adapter for attaching a gooseneck or fifth wheel trailer hitch to a standard, V-shaped, trailer hitch, comprising: a fifth wheel hitch frame including a pair of arms extending therefrom for securement to said V-shaped trailer hitch, and a portion of a substantially vertically disposed, substantially rectangular member having securement means including a front portion bracket for attachment to a front portion of said V-shaped trailer hitch about a hitch ball of said V-shaped trailer hitch, each of said pair of arms extending respectively from said fifth wheel hitch frame, each of said pair of arms having a bracket for attaching said fifth wheel frame to said V-shaped trailer hitch.

8. The hitch adapter in accordance with claim 7, wherein said front portion bracket has an aperture for accommodating said hitch ball.

* * * * *